Patented Dec. 29, 1942

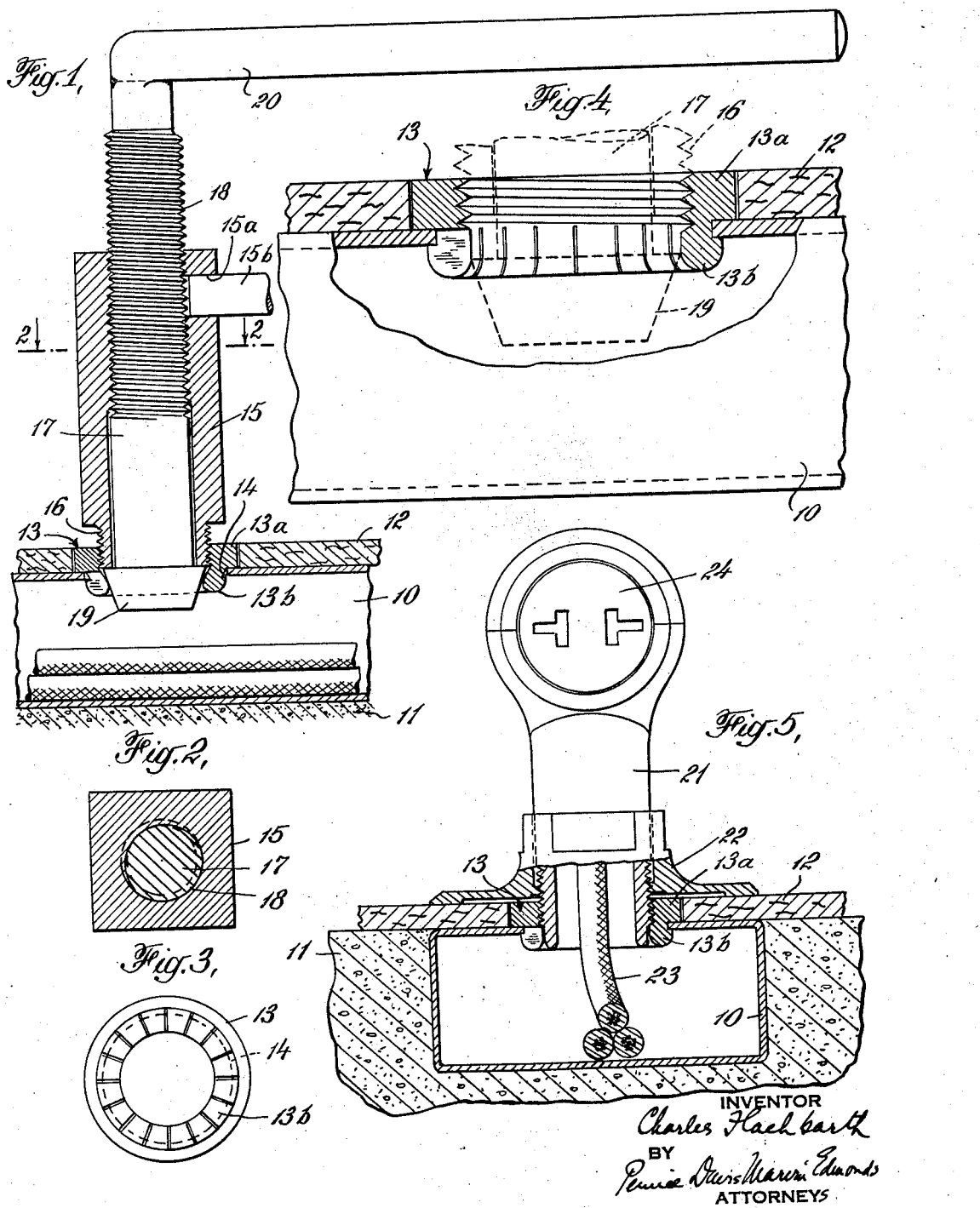

2,306,619

UNITED STATES PATENT OFFICE 2,306,619

TOOL

Charles Flachbarth, Philadelphia, Pa., assignor to Hervey S. Walker, Ardmore, Pa.

Application November 19, 1940, Serial No. 366,266

4 Claims. (Cl. 81—15)

This invention relates to tools to be used for expanding ferrules in openings and is concerned more particularly with a novel tool suitable for the expansion in an opening in a thin wall of a ferrule having an internal thread leading to the expansible portion. While the new tool may be employed for its intended purpose in connection with ferrules used for many purposes, it is particularly useful in performing the operations by which an outlet is made in a duct forming part of an underfloor duct system.

In wiring systems of the steel duct type in which the ducts are laid with their upper surfaces flush with the surface of a concrete floor, for example, so as to be concealed by the linoleum or other floor covering, the outlet openings are ordinarily made at the points where service is desired after the duct has been installed. Also, in concealed steel underfloor systems of the preset type, such as are disclosed in Walker Patent No. 1,592,548, issued July 13, 1926, it sometimes happens that an outlet must be provided at a point between the outlet fittings mounted in the duct prior to its installation in the floor structure. In either case, the operations involved include exposure of the upper surface of the duct at the desired point, either by cutting away part of the floor covering or by removal of both the floor covering and floor material beneath it, and the cutting of a hole in the top wall of the duct. Thereafter, an expansible ferrule is inserted in the opening and expanded in place and such a ferrule may advantageously have an internal thread leading to the expansible part, so that after the ferrule has been expanded, a standpipe or other fitting may be threaded into it.

In the expansion of such a ferrule in an opening in the duct of a steel underfloor wiring system, difficulties are encountered because the duct wall is of thin material and if a tapering tool is driven into the ferrule to expand it, the force applied to the tool may be sufficient to bend the duct wall inwardly around the opening. Such distortion of the duct is objectionable in that it reduces the cross-section of the duct and also makes it difficult to expand the ferrule to a tight fit.

The present invention is, accordingly, directed to the provision of a novel tool for expanding a ferrule of the type described, the tool effecting expansion of the ferrule by the application of force in such manner that inward bending of the duct adjacent the opening is unlikely.

The new tool comprises a block having an externally threaded end portion, so that it may be threaded into the ferrule, and a passage which leads from end to end of the block. The wall of the passage is internally threaded for at least a portion of its length and a rod lies within the passage and has threads engaged with those on the interior of the block. The end of the rod adjacent the threaded end portion of the block terminates in a head which is of increasing diameter inward from its ends and is of a shape and size suitable for expansion of the ferrule with which the wall is to be employed. At the other end, the rod is provided with a handle or other means by which it can be rotated, and the threads on the end portion of the block and on the rods are opposite in hand. Preferably the block is provided with means by which it can be kept from turning while the rod is being rotated to expand the ferrule, although, if desired, the block may be of suitable shape to permit its being held by a wrench.

For a better understanding of the invention, reference may be had to the accompanying drawing in which Fig. 1 is a vertical sectional view through a portion of the duct and of the new tool in use in expanding a ferrule in an opening in a duct;

Fig. 2 is a sectional view on the line 2—2 of Fig. 1;

Fig. 3 is a bottom plan view of the ferrule with which the tool is to be used;

Fig. 4 is an enlarged view similar to Fig. 1 showing the ferrule expanded; and

Fig. 5 is a view showing the connection through the ferrule completed.

In the drawing, the use of the tool in the expansion of a ferrule in a duct system of the flush type is illustrated. The system includes a duct 10 which is of thin sheet steel and is rectangular in section. The duct is embedded in the floor material 11, here shown as cement, and lies with its upper surface flush with the floor and concealed by the floor covering 12 which may be of linoleum.

In making an outlet in this duct, an opening is cut through the top wall of the duct by a suitable cutter, a portion of the linoleum having first been removed, if the outlet is to be made after the linoleum has been laid. Into this opening is inserted a ferrule 13 which is preferably of brass and has an upper section 13a internally threaded and a lower section 13b which is radially slotted so as to be readily expansible. The section 13b initially has an internal diameter substantially less than that of the section 13a and the two sections are connected by a neck 14 of less outer diameter than either section. When the section 13b of the ferrule has been passed through the opening in the duct wall, the neck lies opposite the wall of the opening.

The ferrule thus inserted is expanded by the new tool which comprises a block 15 which may be of steel and is preferably rectangular in section. This block has an end portion 16 which is externally threaded and so constructed that it may be threaded into the section 13a of the ferrule. A passage is formed from end to end of the block and is internally threaded for at least a portion of its length, the threads in the passage and those on the end portion 16a of the block being preferably opposite in hand.

Extending through the passage in the block is a rod 17, formed with threads 18 engaging with those in the wall of the passage. The rod extends entirely through the block and its end lying beyond the end portion 16 of the block terminates in a head 19 which is of increasing diameter inward from its extreme outer end. At the other end of the rod, means are provided for rotation of the rod, as, for example, a handle 20 is attached to the rod and extends at right angles thereto.

In the use of the new tool for expansion of the ferrule, the rod is first moved back into the block by rotation of the handle until the head 19 lies against the end of the threaded end portion 16. The portion 16 is then threaded into the section 13a of the ferrule, this operation continuing until the generally conical lateral surface of the head makes contact with the inner surface of the expansible section 13b of the ferrule. Thereafter, the rod is rotated in such direction as to move the head away from the block and in this movement, the conical surface of the head engages the inner surface of section 13b and expands the section until its outer edge lies beneath the wall of the duct adjacent the opening, as illustrated in Fig. 4. The ferrule is thus caused to grip the edge of the opening tightly and thereafter the rod is rotated in the reverse direction to withdraw the head from contact with section 13b and the block unthreaded from section 13a.

By the use of threads opposite in hand on the end portion of the block and on the rod, the rotation of the rod to effect endwise movement thereof to expand the ferrule does not react on the block to cause it to be unscrewed from the ferrule. Preferably the block is provided with means by which it can be readily threaded into the ferrule and then held from turning while the rod is being rotated to expand the ferrule. For this purpose, the block may be formed with an opening 15a receiving the end of a handle bar 15b, or the block may be made rectangular in section or formed with flat sides so that a wrench may be applied thereto for the purpose mentioned.

After expansion of the ferrule in the manner described, the formation of the outlet is completed by the threading of a standpipe 21 into the ferrule. This fitting is provided with a collar 22 threaded thereon and adapted to be moved down against the surface of the linoleum to clamp the latter and hold the standpipe firmly in place. The connections 23 from the wires in the duct then pass up through the ferrule and standpipe to the receptacle 24 at the upper end of the standpipe. In systems in which the runs of ducts are wholly embedded, the standpipe is not threaded into the ferrule but into a union threaded on the upper end of a nipple threaded into the ferrule.

I claim:

1. A tool for expanding a ferrule in an opening, the ferrule having an internal threaded portion beyond which is an expansible portion which, in its unexpanded condition, has an internal diameter less than that of the threaded portion, which tool comprises a block having an externally threaded end portion adapted to be screwed into the ferrule, the block also having a passage which leads from end to end thereof and has a thread cut in its wall for at least a part of its length, a rod extending through the passage and having threads engaged by those in the passage wall, a head on the end of the rod adjacent the externally threaded end portion of the block, the maximum diameter of the head being less than the internal diameter of the threaded portion of the ferrule but greater than the internal diameter of the expansible portion of the ferrule when that portion is in unexpanded condition, said head having a circumferential working surface adapted to engage and force radially outwardly the expandible part of the ferrule, said working surface increasing in diameter inwardly and having the portion thereof of maximum diameter lying inwardly from the point of least diameter of the expansible portion of the ferrule at the beginning of an expanding operation, and means on the rod for rotating it to cause the head to move outwardly axially of the ferrule and the working surface thereof to engage and radially expand the expansible portion of the ferrule.

2. A tool for expanding a ferrule in an opening, the ferrule being of the type that has a bore therethrough and is provided with an external abutment and internal screw threads at one end thereof and an expansible portion at the other end thereof which, in its unexpanded condition, has an internal diameter less than that of the threaded portion and extends into the bore, said tool comprising a block having one end of a size and shape adapting it to enter the threaded end of the bore of the ferrule and provided with external screw threads to engage the threads of the ferrule to hold the block to the ferrule, said block having a passage which leads from end to end thereof and has a thread cut in its wall for part of its length, a rod extending through the passage and having threads engaged by those in the passage wall, said rod projecting beyond the block at both ends thereof, a head on the end of the rod adjacent the threaded portion of the block, the head having a circumferential working surface increasing in diameter inwardly from its outer end, and means on the rod at the other end of the block for rotating the rod to move it longitudinally of the block, said head having its inner or trailing end of a diameter larger than the diameter of said expansible portion when said expansible portion is in its unexpanded condition, and, at the start of an expanding operation, having said inner or trailing end lying within the body of the ferrule inwardly from the point of least diameter of the expansible portion of the ferrule, whereby actuation of said rod will force said head away from said block and against and through said expansible portion to force the same outwardly and form a shoulder on the other end of the ferrule.

3. A tool for expanding a ferrule in an opening as set forth in claim 1, in which the hand of the thread which is cut in the passage of the block is opposite to that of the external thread on the end portion of the block which is adapted to be screwed into the ferrule.

4. A tool for expanding a ferrule in an opening as set forth in claim 1, in which the rod has a handle at the side of the block opposite to that side which is screwed into the ferrule, by which the rod may be rotated to move it longitudinally of the block and in which the block has a handle bar extending laterally therefrom.

CHARLES FLACHBARTH.